(12) United States Patent
Roy et al.

(10) Patent No.: US 9,956,526 B2
(45) Date of Patent: May 1, 2018

(54) POISON-RESISTANT CATALYST AND SYSTEMS CONTAINING SAME

(71) Applicant: Tecogen Inc., Waltham, MA (US)

(72) Inventors: Jean Roy, Middleton, MA (US);
Robert Panora, Cambridge, MA (US);
Daniel Ott, Malvern, PA (US); David Wallace, Malvern, PA (US)

(73) Assignee: Tecogen Inc., Waltham, MA (US)

( * ) Notice: Subject to any disclaimer, the term of this patent is extended or adjusted under 35 U.S.C. 154(b) by 0 days. days.

(21) Appl. No.: 15/079,938

(22) Filed: Mar. 24, 2016

(65) Prior Publication Data

US 2016/0279572 A1    Sep. 29, 2016

Related U.S. Application Data

(60) Provisional application No. 62/137,637, filed on Mar. 24, 2015.

(51) Int. Cl.
*B01J 21/04* (2006.01)
*B01J 21/06* (2006.01)
(Continued)

(52) U.S. Cl.
CPC ....... *B01D 53/9477* (2013.01); *B01D 53/945* (2013.01); *B01D 53/9454* (2013.01); *B01J 21/063* (2013.01); *B01J 21/08* (2013.01); *B01J 23/42* (2013.01); *B01J 23/44* (2013.01); *B01J 23/462* (2013.01); *B01J 23/464* (2013.01);
(Continued)

(58) Field of Classification Search
CPC ........ B01J 21/04; B01J 21/063; B01J 21/066; B01J 21/08; B01J 23/10; B01J 23/42; B01J 23/44; B01J 23/464; B01J 23/54; B01J 23/56; B01J 23/60; B01J 23/63;
(Continued)

(56) References Cited

U.S. PATENT DOCUMENTS 5,047,220 A    9/1991  Polcer
5,128,306 A *  7/1992  Dettling ............... B01D 53/945
                                                    423/213.5
(Continued)

FOREIGN PATENT DOCUMENTS

WO    WO2011136756 A1    11/2011

OTHER PUBLICATIONS

J. P. Roy et al., "Exhaust Temperature Control Enhances Dual Stage Catalyst System Performance on Engines Fueled with Low-Pressure Natural Gas", Sep. 10, 2012, SAE International.
(Continued)

*Primary Examiner* — Cam N. Nguyen
(74) *Attorney, Agent, or Firm* — Intrinsic Law Corp.

(57) ABSTRACT

A poison-resistant catalytic converter includes a washcoat having a support material comprised of titania and/or silica and a plurality of platinum group metal particles disposed in the support material. The washcoat is disposed on a substrate having a plurality of cells that define respective apertures. The catalytic converter is resistant to poisoning from sulfur and phosphorous compounds while operating at low temperatures. Applications include spark ignited internal combustion engines in combined heat and power systems, vehicles, combustion turbines, boilers and other applications for utilities, industry and vehicle emissions control.

6 Claims, 9 Drawing Sheets

(51) Int. Cl.
*B01J 21/08* (2006.01)
*B01J 23/10* (2006.01)
*B01J 23/42* (2006.01)
*B01J 23/44* (2006.01)
*B01J 23/46* (2006.01)
*B01J 23/54* (2006.01)
*B01J 23/56* (2006.01)
*B01J 23/60* (2006.01)
*B01J 23/63* (2006.01)
*B01J 23/89* (2006.01)
*B01D 53/94* (2006.01)
*B01J 23/652* (2006.01)
*B01J 23/656* (2006.01)
*B01J 35/04* (2006.01)
*B01J 37/00* (2006.01)
*B01J 37/02* (2006.01)
*B01J 37/04* (2006.01)
*B01J 37/08* (2006.01)
*B01J 37/03* (2006.01)
*B01J 35/10* (2006.01)

(52) U.S. Cl.
CPC .............. *B01J 23/54* (2013.01); *B01J 23/60* (2013.01); *B01J 23/63* (2013.01); *B01J 23/6525* (2013.01); *B01J 23/6527* (2013.01); *B01J 23/6562* (2013.01); *B01J 23/89* (2013.01); *B01J 23/8906* (2013.01); *B01J 23/8926* (2013.01); *B01J 35/04* (2013.01); *B01J 35/1014* (2013.01); *B01J 35/1019* (2013.01); *B01J 37/0036* (2013.01); *B01J 37/0215* (2013.01); *B01J 37/0236* (2013.01); *B01J 37/0248* (2013.01); *B01J 37/038* (2013.01); *B01J 37/04* (2013.01); *B01J 37/08* (2013.01); *B01D 53/944* (2013.01); *B01D 2255/102* (2013.01); *B01D 2255/1021* (2013.01); *B01D 2255/1023* (2013.01); *B01D 2255/1025* (2013.01); *B01D 2255/206* (2013.01); *B01D 2255/2065* (2013.01); *B01D 2255/2073* (2013.01); *B01D 2255/2092* (2013.01); *B01D 2255/20707* (2013.01); *B01D 2255/20715* (2013.01); *B01D 2255/20738* (2013.01); *B01D 2255/20761* (2013.01); *B01D 2255/20769* (2013.01); *B01D 2255/20776* (2013.01); *B01D 2255/30* (2013.01); *B01D 2255/9207* (2013.01); *Y02T 10/22* (2013.01)

(58) Field of Classification Search
CPC .................... B01J 23/6525; B01J 23/6527; B01J 23/6562; B01J 23/89; B01J 23/8906; B01J 23/8926
See application file for complete search history.

(56) References Cited

U.S. PATENT DOCUMENTS

| | | | | |
|---|---|---|---|---|
| 5,202,299 A * | 4/1993 | Symons | ............... | B01D 53/945 502/242 |
| 5,334,570 A * | 8/1994 | Beauseigneur | .......... | B01J 23/40 502/240 |
| 5,628,975 A | 5/1997 | Horiuchi et al. | | |
| 5,707,148 A * | 1/1998 | Visser | ................... | C04B 41/009 204/424 |
| 5,813,764 A * | 9/1998 | Visser | ................... | C04B 41/009 204/424 |
| 5,856,263 A * | 1/1999 | Bhasin | ................. | B01D 53/945 423/213.5 |
| 6,178,744 B1 | 1/2001 | Perset | | |
| 6,258,029 B1 * | 7/2001 | Guracar | ................... | A61B 8/08 600/443 |
| 6,372,686 B1 * | 4/2002 | Golden | ................ | B01D 53/945 502/302 |
| 6,492,297 B1 * | 12/2002 | Sung | .................... | B01D 53/945 502/302 |
| 6,531,425 B2 * | 3/2003 | Golden | ................ | B01D 53/945 502/302 |
| 7,276,212 B2 * | 10/2007 | Hu | ..................... | B01D 53/9454 422/168 |
| 7,374,729 B2 * | 5/2008 | Chen | .................... | B01D 53/945 422/177 |
| 7,947,238 B2 * | 5/2011 | Deeba | .................. | B01D 53/944 423/213.2 |
| 8,545,780 B1 * | 10/2013 | Chen | .................... | B01D 53/945 423/213.2 |
| 8,578,704 B2 | 11/2013 | Gehret et al. | | |
| 8,679,433 B2 * | 3/2014 | Yin | ...................... | B01D 53/944 423/213.2 |
| 8,815,189 B2 * | 8/2014 | Arnold | ............... | B01D 46/2429 423/213.2 |
| 8,835,346 B2 * | 9/2014 | Gramiccioni | ........ | B01J 37/0242 423/213.2 |
| 8,969,237 B2 * | 3/2015 | Yin | ...................... | B01D 53/944 427/446 |
| 9,034,287 B2 * | 5/2015 | Gerlach | ............... | B01J 29/7415 423/213.5 |
| 9,067,197 B2 * | 6/2015 | Doering | ................. | B01J 21/063 |
| 9,121,326 B2 | 9/2015 | Gehret et al. | | |
| 9,283,547 B2 * | 3/2016 | Alive | ...................... | B01J 23/63 |
| 9,321,042 B2 * | 4/2016 | Hoke | ................... | B01J 37/0244 |
| 9,358,533 B2 * | 6/2016 | Tran | ......................... | B01J 32/00 |
| 9,498,751 B2 * | 11/2016 | Yin | ...................... | B01D 53/944 |
| 2004/0209769 A1 | 10/2004 | Demel et al. | | |
| 2005/0282701 A1 | 12/2005 | Foong et al. | | |
| 2008/0317999 A1 * | 12/2008 | Patchett | ............. | B01D 53/9418 428/116 |
| 2010/0080737 A1 | 4/2010 | Nochi et al. | | |
| 2013/0004392 A1 | 1/2013 | Roy et al. | | |
| 2013/0168969 A1 | 7/2013 | Markoski | | |
| 2014/0196438 A1 | 7/2014 | Gehret et al. | | |
| 2015/0140317 A1 * | 5/2015 | Biberger | .................. | B01J 21/04 428/317.9 |
| 2015/0217229 A1 * | 8/2015 | Yin | ...................... | B01D 53/944 423/213.5 |
| 2015/0252700 A1 | 9/2015 | Gehret et al. | | |
| 2016/0076419 A1 | 3/2016 | Roy | | |
| 2016/0228852 A1 * | 8/2016 | Biberger | .................. | B01J 23/63 |

OTHER PUBLICATIONS

D. Ginosar, "Report on 1,000 Hour Catalyst Longevity Evaluation", Jun. 2009, Idaho National Laboratory Science and Engineering, prepared for the U.S. Dept. of Energy Office of Nuclear Energy.
US International Searching Authority, "International Search Report—PCT/US16/23998", dated Aug. 18, 2016, WIPO.

* cited by examiner

POISON-RESISTANT CATALYST AND SYSTEMS CONTAINING SAME

RELATED APPLICATIONS

This application claims the benefit of and priority to U.S. Provisional Application No. 62/137,637, filed on Mar. 24, 2015, entitled "Method and System Having a Sulfur Resistant Assembly for Reducing Unwanted Emissions in Engine Exhausts," which is incorporated herein by reference.

TECHNICAL FIELD

The present application relates generally to treatment of exhaust generated by internal combustion engines, combustion turbines, and boilers and more particularly to systems and method for treating exhausts containing one or more poisons, such as sulfur.

BACKGROUND

Spark ignited (SI) internal combustion (IC) engines, combustion turbines, and boilers operated with hydrocarbon fuels produce small amounts of undesirable chemical compounds in the combustion chamber, compounds which are exhausted from the engine at high temperatures (e.g., 800° F.-1250° F.). For fuels composed primarily of methane and other light hydrocarbons, the commonly regulated chemicals are nitrogen oxides (NO, $NO_2$, or generally NOx) and carbon monoxide (CO). Nitrogen oxides are formed when nitrogen ($N_2$), a major component of air, reacts with oxygen ($O_2$), another major component of air, when both are exposed to high temperatures and pressures in an engine combustion chamber. Carbon monoxide, on the other hand, is the consequence of failure of the fuel to completely react with oxygen. Carbon dioxide (CO2) (and water) is formed when the fuel does react with oxygen.

CO and NOx are problematic pollutants inasmuch as their regulated values are in many geographical regions set at or below the limits of current technology. In addition, hydrocarbon emissions (CxHy), which result from the failure to completely react all of the fuel with oxygen, are also regulated.

It is known to use catalytic exhaust systems to reduce the emission of problematic pollutants from SI/IC engines. An example of such a catalytic system is a three-way catalytic converter (TWC). A TWC typically includes platinum as the active catalytic material on an alumina support.

Recently, multistage emission control systems have been proposed that include two or more stages of catalytic converters. An example of such a multistage system is disclosed in U.S. Pat. No. 8,578,704, entitled "Assembly and Method for Reducing Nitrogen Oxides, Carbon Monoxide and Hydrocarbons in Exhausts of Internal Combustion Engines," assigned to the present Applicant, which is incorporated herein by reference. Multistage systems are used to improve the removal efficiency of pollutants by using multiple stages of catalytic converters, each configured to remove particular pollutants. For example, the '704 patent discloses a two-stage catalytic system where the exhaust is cooled (e.g., to less than 650° F.) and oxygenated between stages. The resulting system provides NOx removal in the first stage and CO and CxHy removal in the second stage.

A problem with multistage emission control systems is that the CO removal efficiency of the second stage catalytic converter can degrade over a relatively short time period, for example from an initial CO removal efficiency of 90% or more to a second CO removal efficiency of less than 20% after several hundred hours of operation.

Further, lean burn IC engines with single stage or multiple stage catalytic converters have particular difficulty with low temperature oxidation of CO and hydrocarbons (CxHy) as the catalyst quickly degrades after a relatively short time period of operation. For example, lean burn IC engines operating at temperatures below 650° F. can degrade from an initial CO removal efficiency of 90% to a second removal efficiency of less than 80% after several hundred hours of operation.

What is needed is a system and method that overcomes the above deficiencies.

SUMMARY

An aspect of the invention is directed to a catalytic converter. The catalytic converter includes a substrate body having a plurality of cells that define respective apertures. The catalytic converter also includes a washcoat disposed on the substrate. The washcoat includes a support material comprised of at least one of titania or silica. The washcoat also includes a plurality of particles disposed in the support material, the particles comprised of a platinum group metal, the platinum group metal including at least one of Pt, Pd, and Rh.

Another aspect of the invention is directed to a method of manufacturing a poison-resistant catalyst. The method includes milling a support material to form a powder-like substance, the support material containing at least 50% by weight of titania or silica. The method also includes mixing particles comprised of a platinum group metal into the milled support material to form a mixed milled support material. The method also includes forming a washcoat slurry from the mixed milled support material. The method also includes coating a substrate with the washcoat slurry, the substrate including a plurality of cells defining respective apertures. The method also includes drying the coated substrate at a first temperature to evaporate the washcoat slurry while reducing a sublimation of a liquid from a solid phase of the washcoat. The method also includes after the drying act, calcining the coated substrate.

Another aspect of the invention is directed to a system for treating exhaust generated by a rich burn spark-ignited internal combustion engine. The system includes a first-stage catalyst chamber including a three-way catalyst (TWC), the first-stage catalyst chamber in fluid communication with an exhaust outlet of the engine, the first stage catalyst chamber removing at least a portion of an NOx, CO, and CxHy content in the exhaust to form a first output exhaust. The system also includes a cooling apparatus in fluid communication with an outlet of the first-stage catalyst chamber, the cooling apparatus configured to cool the first output exhaust to 300° F.-650° F., the cooling apparatus outputting a cooled exhaust. The system also includes an air injector in fluid communication with a conduit extending from an outlet of the cooling apparatus, the air injector configured to increase an oxygen content of the cooled exhaust to 0.25%-2.0% by volume. The system also includes a second-stage catalyst chamber including a poison-resistant catalyst, the second-stage catalyst chamber in fluid communication with the conduit to receive the cooled and oxygenated exhaust. The poison-resistant catalyst includes a substrate body having a plurality of cells that define respective apertures. The poison-resistant catalyst also includes a washcoat disposed on the substrate. The washcoat includes a support material comprised of at least one of titania or silica. The washcoat also includes a plurality of particles disposed in the support material, the particles comprised of a platinum group metal, the platinum group metal including at least one of Pt, Pd, and Rh. The second-stage catalyst chamber removes at least a portion of a CO content and a hydrocarbon content of the cooled exhaust.

Another aspect of the invention is direct to a method of operating a catalytic system for reducing emissions from a rich burn spark-ignited internal combustion engine. The method includes controlling a ratio of intake air and fuel (AFR) to the engine so the engine operates in a rich burn regime, the engine generating first exhaust gases substantially free of oxygen. The method also includes passing said first exhaust gases into a first-stage catalyst chamber containing a three-way catalyst (TWC), which minimizes NOx content by reducing NOx (to $N_2$ and $O_2$), CO, and hydrocarbons to form second exhaust gases. The method also includes cooling said second exhaust gases to 300° F.-650° F. The method also includes increasing an oxygen content of said second exhaust gases to about 0.25-2.0%. The method also includes passing said cooled and oxygenated exhaust through a second-stage catalyst chamber containing a poison-resistant catalyst that minimizes a CO content and a hydrocarbon content through oxidation reactions. The poison-resistant catalyst includes a substrate body having a plurality of cells that define respective apertures. The poison-resistant catalyst also includes a washcoat disposed on the substrate. The washcoat includes a support material comprised of at least one of titania or silica. The washcoat also includes a plurality of particles disposed in the support material, the particles comprised of a platinum group metal, the platinum group metal including at least one of Pt, Pd, and Rh.

In another aspect, the invention is directed to a system for treating exhaust generated by a lean burn spark-ignited internal combustion engine. The system includes a cooling apparatus adapted to remove heat energy from the exhaust such that an input temperature of the exhaust is greater than an output temperature of the exhaust, the output temperature of the exhaust less than or equal to 650° F. The system also includes a catalytic converter including a poison-resistant catalyst, the catalytic converter in fluid communication with an output of the heat exchanger. The poison-resistant catalyst includes a substrate body having a plurality of cells that define respective apertures. The poison-resistant catalyst also includes a washcoat disposed on the substrate. The washcoat includes a support material comprised of at least one of titania or silica. The washcoat also includes a plurality of particles disposed in the support material, the particles comprised of a platinum group metal, the platinum group metal including at least one of Pt, Pd, and Rh. The catalytic converter removes at least a portion of a CO content and a hydrocarbon content of the exhaust.

Another aspect of the invention is directed to method of operating a catalytic system for reducing emissions from a lean burn spark-ignited internal combustion engine. The method includes controlling a ratio of intake air and fuel (AFR) to the engine so the engine operates in a lean burn regime. The method also includes, with a cooling apparatus, cooling said second exhaust gases to less than or equal to 650° F. The method also includes passing said cooled and oxygenated exhaust through a catalytic converter containing a poison-resistant catalyst that reduces a CO content and a hydrocarbon content of the exhaust. The poison-resistant catalyst includes a substrate body having a plurality of cells that define respective apertures. The poison-resistant catalyst also includes a washcoat disposed on the substrate. The washcoat includes a support material comprised of at least one of titania or silica. The washcoat also includes a plurality of particles disposed in the support material, the particles comprised of a platinum group metal, the platinum group metal including at least one of Pt, Pd, and Rh.

Other aspects will be apparent upon review of the present disclosure.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

It was determined that the reduced CO removal efficiency in the second stage catalytic converter was caused by catalytic poisoning as result of trace sulfur compounds (e.g., SO2) in the exhaust in combination with the reduced operating temperature (e.g., less than about 650° F.) of the second stage catalytic converter. At the reduced operating temperature, the sulfur dioxide can be oxidized by the platinum active sites on the second catalytic converter to form sulfur trioxide (SO3), which can react with the alumina substrate to form aluminum sulfate ($Al_2(SO_4)_3$) or other sulfates. Aluminum sulfate can block, mask, and/or cover the platinum active sites, which can cause a reduced CO removal efficiency as described above. The aluminum sulfate reaction/catalyst poisoning is generally more stable at lower operating temperatures, such as those in multistage emission control systems, and it is generally not a material issue at higher operating temperatures (e.g., greater than about 700° F.).

To address this issue, the catalytic converter(s) through which low-temperature (e.g., less than about 650° F.) exhaust passes are configured with a sulfur-tolerant support material instead of the reactive alumina support described above. For example, the support material can be comprised of a similar sulfur-tolerant material such as titanium (e.g., titanium dioxide or titania) and/or silicon (e.g., silicon dioxide or silica). It was observed that the CO removal efficiency of the second stage catalytic converter remained at or near the initial CO removal efficiency after several hundred hours of operation when the support material in the second catalytic converter comprised titania. The improved catalytic converter also resists poisoning from phosphorous-containing compounds, which can also exist in exhaust gases.

Figure 1:
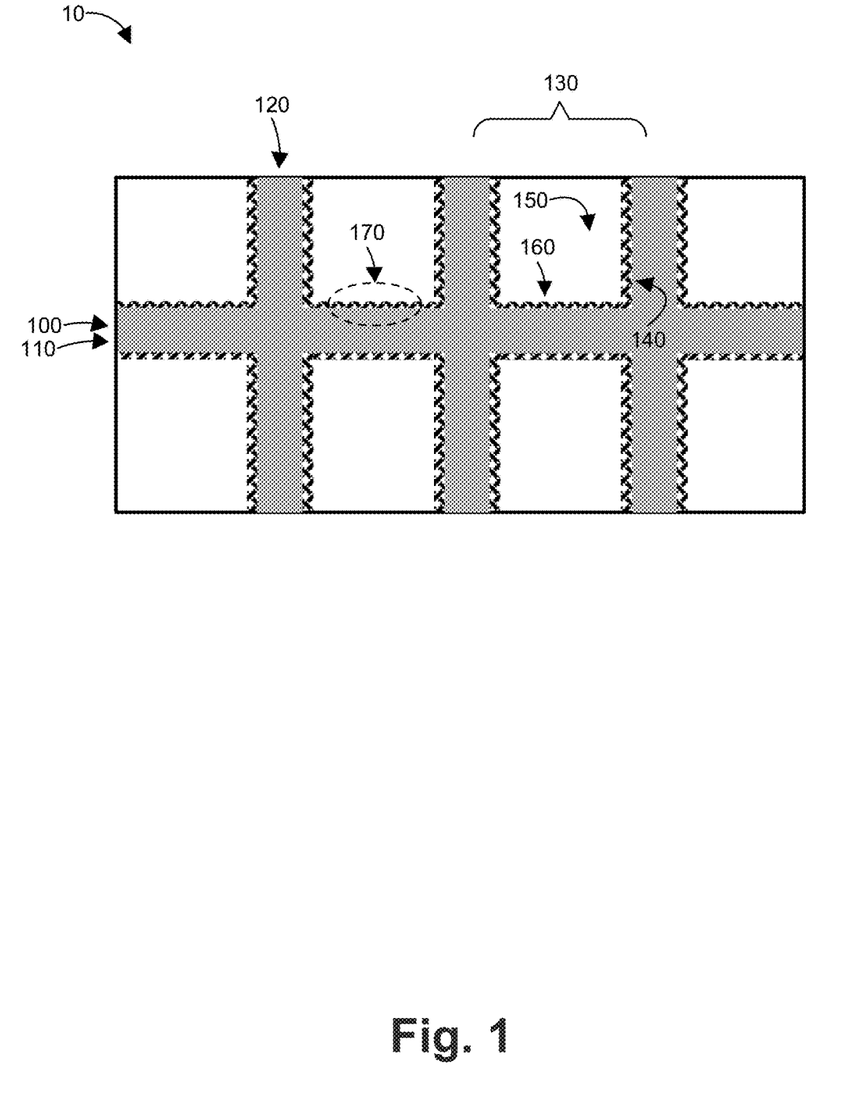
FIG. 1 illustrates a top view of a catalytic assembly 10 according to one or more embodiments.

FIG. 1 illustrates a top view of a catalytic assembly 10 according to one or more embodiments. The assembly 10 includes a substrate 100 that has a lattice structure comprising rows 110 and columns 120. The rows 110 and columns 120 form a wall 140 that defines a plurality of cells 130 and corresponding apertures or cell openings 150 that allow gas (e.g., exhaust) to pass through. The apertures 150 can have various shapes such as a polygon (e.g., square, rectangle, hexagon, etc.), an oval, a circle, or any other regular or irregular shape.

The substrate 100 can be formed out of a metal, a refractory metal, and/or a ceramic. For example, the substrate 100 can be formed out of iron, chromium and aluminum (e.g., "stainless steel"), potassium, magnesium, Cordierite (and other composites), and/or other materials known in the art.

A washcoat 160 is applied to the exposed edges of the wall 140 (e.g., on the exposed sides of rows 110 and columns 120). The washcoat 160 includes a titania or titanium dioxide (TiO2) support material, a platinum group metal (PGM) catalyst, and other additives, as discussed below.

The substrate 100 can have a cell density of about 25 to about 600 cells per square inch (cpsi), commonly about 100 cpsi, about 200 cpsi, about 400 cpsi, about 600 cpsi, or any cell density between any two of the foregoing values. As used herein, "about" means plus or minus 10% of the relevant value. The aperture 150 in the cells 130 should be large enough to allow exhaust or other gas to pass through without restricting flow or creating excessive back pressure, which can have an adverse effect on the engine. The engine can be a spark-ignited internal combustion (SI/IC) engine, such as a SI/IC in a vehicle, in a combustion turbine, in a boiler, in a combined heat and power (CHP) system, or in another system.

Figure 2:
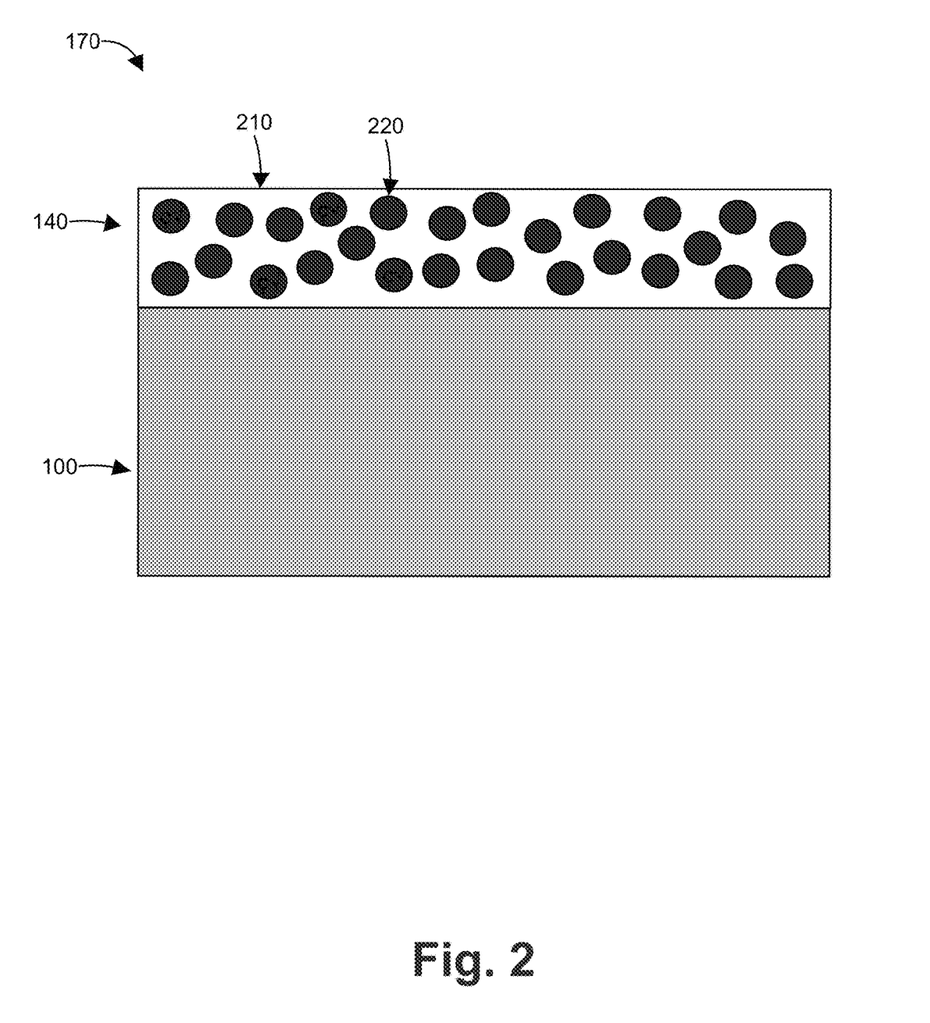
FIG. 2 is an enlargement of a region from FIG. 1.

FIG. 2 is an enlargement of region 170 illustrated in FIG. 1. As shown in FIG. 2, the washcoat 140 includes a support material 210 and a plurality of active materials 220. The thickness of washcoat layer typically ranges from about 25 microns to about 55 microns, including about 35 microns, about 45 microns, or any thickness between any two of the foregoing values. Of course, thicker or thinner layers are possible as would be understood by those skilled in the art.

The support material 210 includes a sulfur-tolerant material, such as titania and/or silica. The titania can be in the form of anatase or other highly porous material, at least in some embodiments. In some embodiments, the support material 210 includes about 50% to about 98% titania by weight, including about 60%, about 70%, about 80%, about 90%, or any concentration between any two of the foregoing values. In some embodiments, the support material 210 includes up to about 20% silica by weight, including about 5%, about 10%, about 15%, or any concentration between any two of the foregoing values. Silica can function as a binder to provide adhesion to the materials in support material 210. In addition or in the alternative, an aluminum sol, such as up to about 20% aluminum sol, can be used as a binder in support material 210.

In some embodiments, titania and/or silica can be mixed with one or more transition metal oxides, one or more base metal oxides and/or one or more rare earth metal oxides. For example, titania and/or silica can be mixed with one or more oxides of Si, Al, Ce, Zr, Fe, Cu, Zn, Mo, W, or Mn. In some embodiments, the transition metal oxides, the base metal oxides, and/or the rare earth metal oxides can comprise up to about 50%, up to about 40%, up to about 30%, up to about 20%, or up to about 10% of the support material 210 by weight. The support material 210 can have a high surface area (e.g., due to regular or irregular features on the support material) that can provide sites for the active materials 220 to bond and to catalyze the oxidation of carbon monoxide and/or hydrocarbons. For example, the support material 210 can include fine particles of titania, such as a mean particle size of less than about 10 microns. Such a particle size can provide the support material 210 with a surface area of about 85 to about 130 $m^2/g$, including about 100 $m^2/g$, 115 $m^2/g$, or any surface area between any two of the foregoing values.

Active materials 220 are disposed or impregnated in support material 210. For example, active materials 220 can be substantially uniformly distributed in support material 210. Active materials 220 include one more PGMs, such as Pt, Pd, and/or Rh. The loading of active materials 220 such as PGMs in support material 210 can be about 20 to 70 about $g/ft^3$, including about 30 $g/ft^3$, about 40 $g/ft^3$, about 50 $g/ft^3$, about 60 $g/ft^3$, or any loading between any two of the foregoing values.

Figure 3:
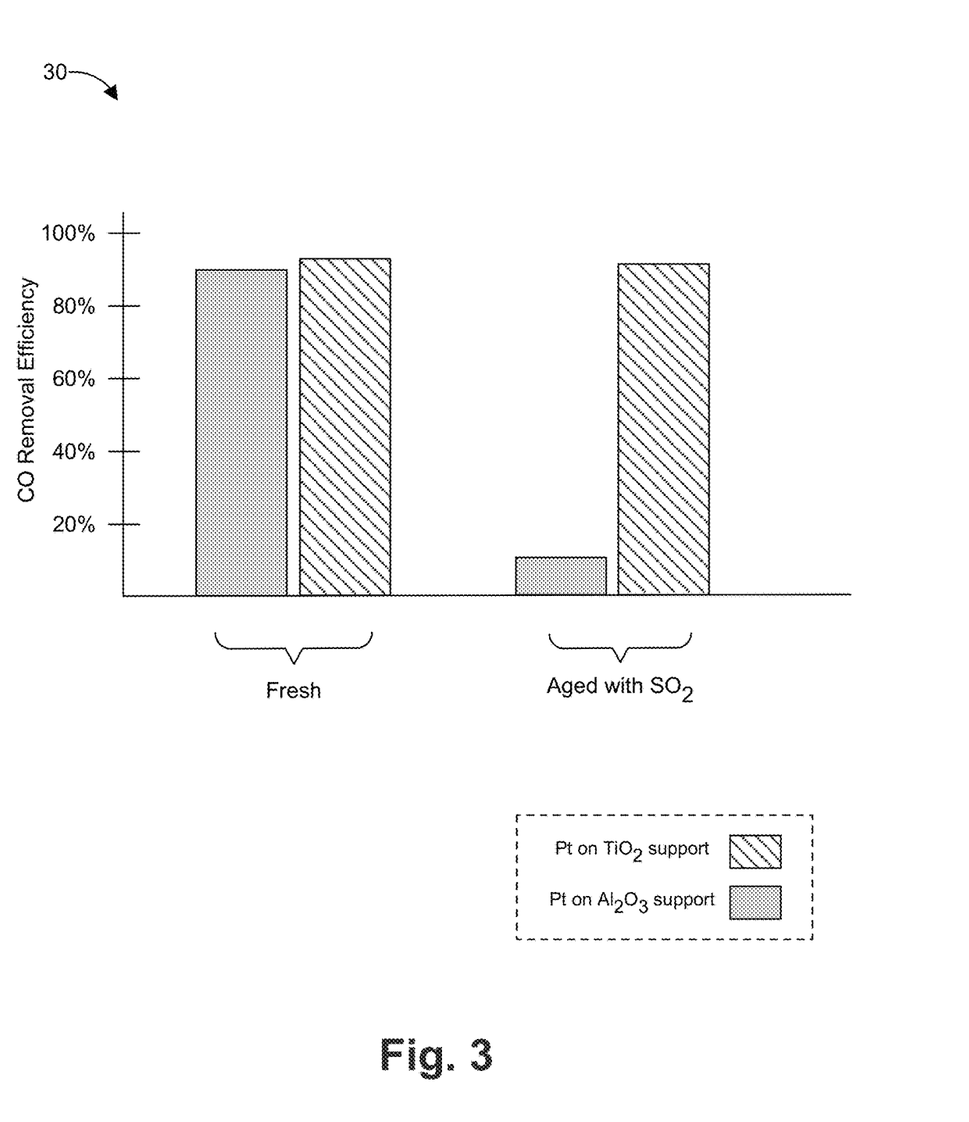
FIG. 3 is a graph illustrating the performance of an embodiment of the catalyst against the prior art catalyst.

FIG. 3 is a graph 30 illustrating the performance of an embodiment of the above catalyst against the prior art catalyst. Specifically, graph 30 illustrates the performance of a platinum catalyst on a titania support (diagonal hashed bars) against the performance of the prior art platinum catalyst on an alumina support (solid bars). The performance of the two catalysts was first measured when the catalyst was fresh (i.e., before exposure to sulfur compounds). As illustrated in FIG. 3, the catalysts had similar CO removal efficiencies (over 90%) when they were fresh.

Next, the catalysts were aged for 500 hours while exposed to a flow of SO2 at a concentration of 200 ppm and at a temperature of 400° F. The space velocity for the test was 100,000/hr and the cell density of the catalysts was 100 cpsi. After aging, the CO removal efficiency of the catalysts was re-measured. As illustrated, the CO removal efficiency of the prior art catalyst dropped to below 20%. In contrast, the titania support catalyst maintained a CO removal efficiency of greater than 90%.

It is also expected that the catalysts can maintain the removal efficiency of other compounds such as unburned hydrocarbons, partially combusted hydrocarbons, and/or hazardous air pollutants (HAPs) (e.g., formaldehyde) in addition to maintaining the removal efficiency of CO. It is also contemplated and expected that the catalytic converter can maintain its removal efficiency of such material(s) for up to the full life of the catalyst, which can be up to about 25,000 hours. IN some embodiments, HAPs are defined by the Clean Air Act and regulated by the Environmental Protection Agency. HAPs can include the pollutants found at the following website, which is incorporated herein by reference: https://www.epa.gov/haps/initial-list-hazardous-air-pollutants-modifications. HAPs can include formaldehyde, benzene, and other organic pollutants that can result from operating a spark-ignited internal combustion engine.

Figure 4:
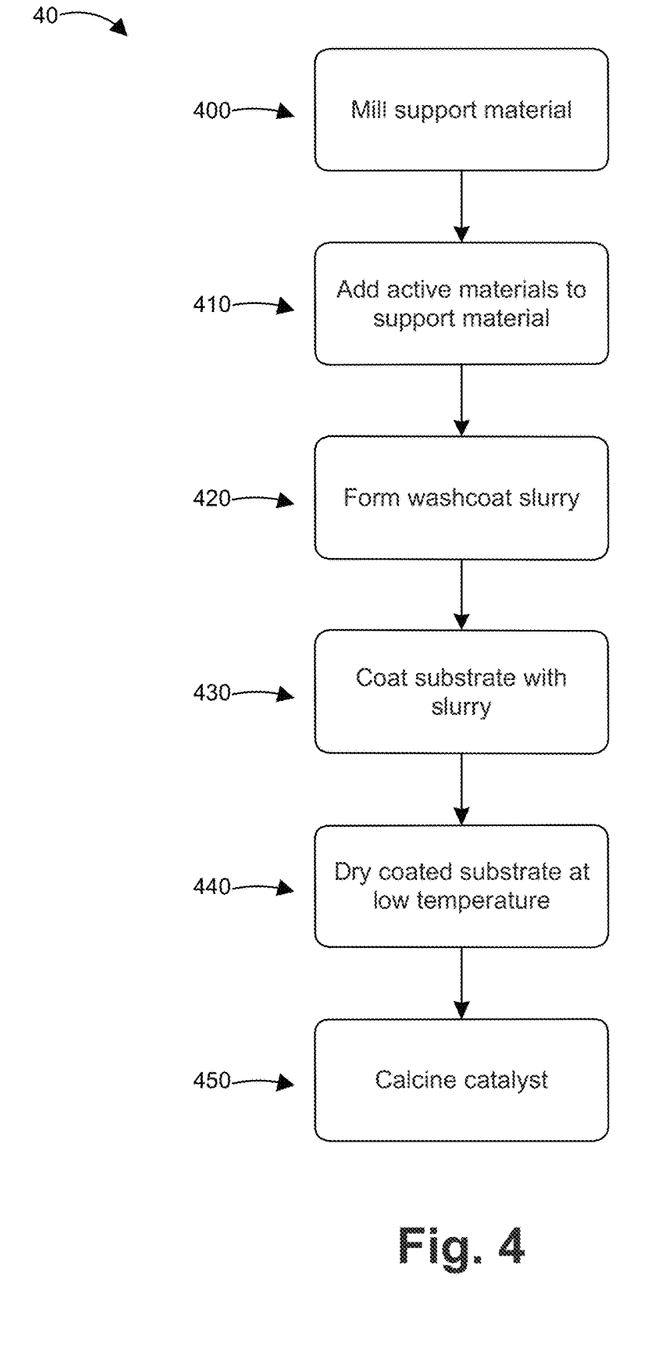
FIG. 4 is a flowchart of an exemplary method of manufacturing a catalytic assembly according to one or more embodiments.

FIG. 4 is a flowchart 40 of an exemplary method of manufacturing a catalytic assembly according to one or more embodiments. In act 400, raw support material is milled or ground to provide a powder-like substance having the particle size distribution discussed above. The particle size distribution can, in some embodiments, improve or enhance adhesion of the washcoat (e.g., washcoat 140) to the substrate (e.g., substrate 100). The milling/grinding can be performed using many different types of equipment, such as a ball mill, a hammer mill, an attritor, or other equipment as known in the art. The milling/grinding equipment is described for purposes of illustration and it is not intended to limit the scope of the disclosure.

The support material can include titania or silica, for example about 50% to about 98% titania and/or up to about 20% silica. The support material can also include one or more transition metal oxides and/or one or more rare earth metal oxides. As discussed above, the transition metal oxides and/or the rare earth metal oxides can comprise up to about 50%, up to about 40%, up to about 30%, up to about 20%, up to about 10% of the support material, or any concentration between any two of the foregoing values.

In act 410, active materials (e.g., PGMs) are added to the milled support material. The active materials are thoroughly mixed with the support material powder to provide a uniform or substantially uniform distribution of the active materials. This act can be performed manually by introducing the PGM solution to the titania powder and stirring, or with a V-blender with spray addition. Additional mixing techniques are known in the art. The resultant mixed powder is then calcined at about 450° C. for up to about 3 hours.

In act 420, a slurry is formed with the active material-support powder mixture from act 410. The slurry can be formed by adding water, such as deionized water, to the active material-support powder mixture to form about a 30% to about a 60% solids mixture, including about a 40% solids mixture, about a 50% solids mixture, or any percentage between any two of the foregoing values. Forming the slurry in act 420 can include high shear mixing with an appropriate high-shear mixer, viscosity adjustment by, among other things, modifying the pH of the slurry, and/or moisture content control by minimizing evaporation.

In act 430, a substrate is coated with the slurry from act 420. The coating process can include dose coating, centrifugal coating, vacuum coating, dip coating, curtain coating, sequential washcoat coating followed by impregnation, or other process as known in the art. Regardless of the coating method, the coating step entails loading enough washcoat onto the surface of the honeycomb substrate to attain the desired washcoat loading of about 1 to about 3 g/cu in., including about 2 g/cu in. The substrate includes a plurality of cells defining apertures, as discussed above.

In some embodiments, the substrate is pretreated before it is coated with the slurry. Pretreating can include but is not limited to calcining the substrate at about 425° C. for about one hour.

In act 440, the coated substrate from act 430 is dried at a low temperature under controlled conditions. The temperature can be low enough so that moisture (e.g., water) is evaporated from the washcoat slurry without (or with minimal) flashing/sublimating moisture from the solid phase of the washcoat, which can inhibit adhesion between the washcoat and the substrate. Flashing moisture can also cause cracking in the solid washcoat. In some embodiments, the drying step includes overnight drying in flowing air at ambient temperature. The catalyst is then dried in an oven, ramping the temperature at about 5° C./min to about 105° C. then holding at about 105° C. for about 2 hours, then ramping at about 5° C./min to about 250° C. and holding at about 250° C. for about an hour. The oven can be a convection oven or a static oven.

In act 450, the low-temperature dried substrate from act 440 is calcined, which causes the washcoat to attach to the substrate through a thermal process. The calcining step entails ramping the temperature at about 5° C./min from about 250° C. to about 425° C. then holding at about 425° C. about 1 hour. The oven can be a convection oven or a static oven. Post calcining, the catalyst is cooled at ambient conditions to room temperature.

Figure 5:
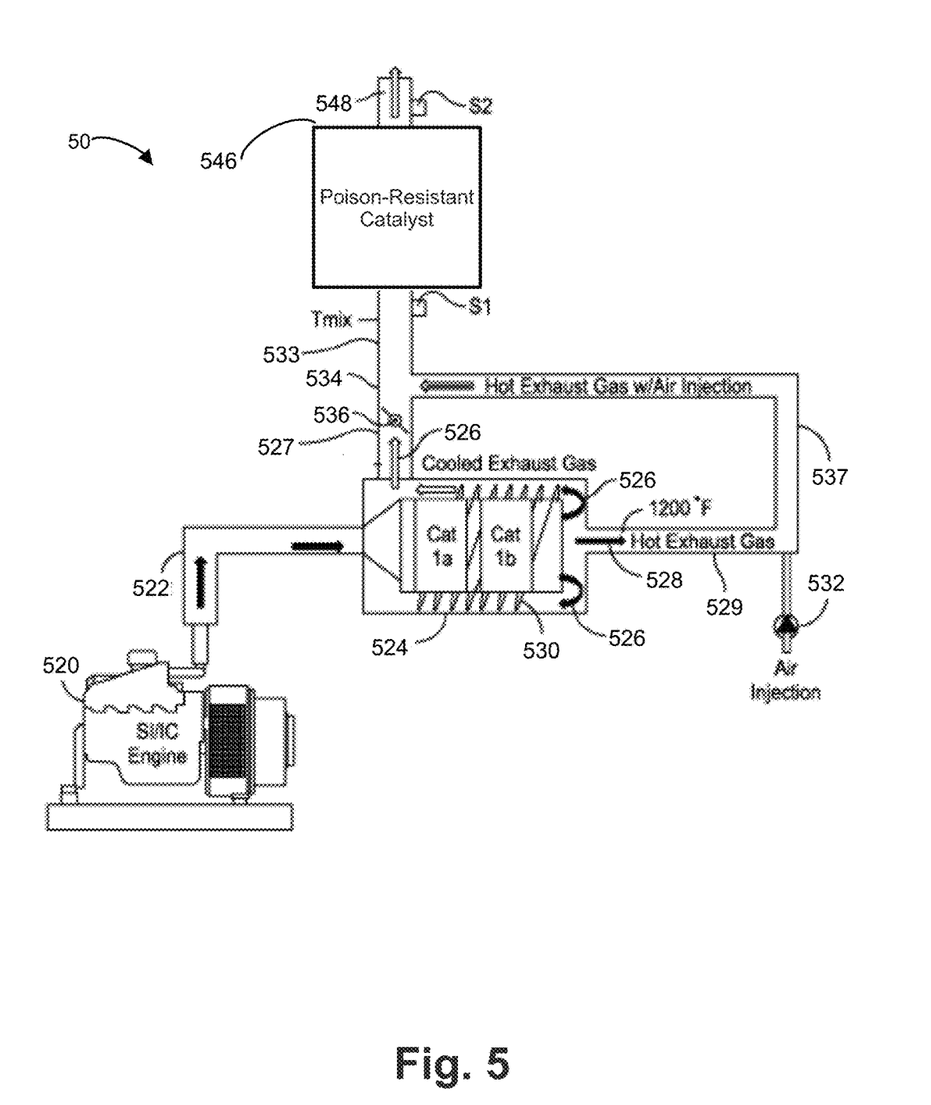
FIG. 5 illustrates an assembly for reducing nitrogen oxides, carbon monoxide and hydrocarbons in internal combustion engine exhausts according to one or more embodiments.

FIG. 5 illustrates an assembly 50 for reducing nitrogen oxides, carbon monoxide and hydrocarbons in rich burn internal combustion engine exhausts according to one or more embodiments. The assembly 50 comprises a first exhaust conduit 522 having an exhaust receiving end for connecting to and extending from an internal combustion engine 520. The internal combustion engine 522 can be powered by gasoline, natural gas, or other fuel. The engine 522 can be a component of a combined heat and power (CHP) system, a vehicle, a combustion turbine, a boiler, or other system. The engine 520 can operate with an air-fuel ratio (AFR) in the rich burn regime (i.e., less than or equal to a stoichiometric AFR needed for complete combustion of the fuel). In some embodiments, the stoichiometric AFR is 14.64:1 (by weight) for gasoline and 17.2:1 (by weight) for natural gas. When the engine operates in the rich burn regime, the exhaust gas contains a minimal or a substantially zero oxygen content. For example, the oxygen content can be less than or equal to about 0.1%, less than or equal to about 0.05%, and/or less than or equal to about 0.025%.

A first stage catalytic converter 524 is in communication with a dispensing end of the first exhaust conduit 522 such that the first stage catalytic converter 524 receives all the exhaust generated by the engine 520. The exhaust generated by the engine 520 can be at a temperature of about 1200° F. The first stage catalytic converter 524 can include a three-way catalyst (TWC), which can eliminate or reduce the concentration of environmentally-harmful NOx compounds, CO, and hydrocarbons in the exhaust gas. For example, the TWC can reduce NOx compounds to form nitrogen ($N_2$) and oxygen ($O_2$).

A cooling apparatus 530 is disposed on the first stage catalytic converter 524 for cooling a first portion 526 of engine exhausts that pass through the first stage catalytic converter 524. The cooling apparatus 530 can include a heat exchanger, cooling coils, a water injector, a cooling vaporizer, and/or a thermoelectric generator (TEG), which can produce electricity in conjunction with cooling the exhaust gases. In some embodiments, the assembly 50 includes a TEG and a second cooling apparatus downstream of the TEG. The cooling apparatus 530 can cool the first potion 526 of the exhaust stream from about 1200° F. to about 150° F. to about 350° F., including about 200° F., about 250° F., about 300° F., about 400° F., about 500° F., or any temperature between any two of the foregoing values. An example of a multistage emissions control system that includes a TEG is disclosed in U.S. patent application Ser. No. 11/616,752, entitled "Assembly and Method for Reducing Nitrogen Oxides, Carbon Monoxide, Hydrocarbons, and Hydrogen Gas in Exhausts of Internal Combustion Engines and Producing an Electrical Output," filed on Sep. 14, 2012, assigned to the present Applicant, which is incorporated herein by reference.

A second portion 528 of engine exhaust that passes through the first stage catalytic converter 524 exits an outlet conduit of the first stage catalytic converter 524 and passes through a second outlet conduit 529. The second portion 528 of engine exhaust is not cooled or substantially cooled by cooling apparatus 530 and thus is close to the exit temperature (e.g., about 1200° F.) of the exhaust exiting engine 520. An air injector 532 injects air or oxygen into the second outlet conduit 529 to increase the oxygen content of the second portion 528 of engine exhausts as it passes through air injection conduit 537. The air injection conduit 537 is in communication with first outlet conduit 527.

The cooled first exhaust portion 526 and hot second exhaust portion 528 combine at junction 534 and proceed through second exhaust conduit 533 to second stage catalytic converter 546. A mixing valve 536 is optionally disposed in first outlet conduit 527 between the first stage catalytic converter and junction 534. The mixing valve 536 controls the volume of cooled first exhaust portion 526 that combines with hot second exhaust portion 528. Thus by controlling mixing valve 536, the temperature Tmix of the combined exhaust stream that flows through second exhaust conduit 533 to second stage catalytic converter 546 can be controlled, for example by a microprocessor-based controller. One or more thermocouples (or other temperature-sensitive apparatus) can be disposed in the first exhaust conduit 522, the first outlet conduit 527, the air second outlet conduit 529, the air injection conduit 537, and/or the second exhaust conduit 533. The thermocouple(s) can be in communication with the controller. The treated exhaust gas exits the second stage catalyst 546 through exhaust outlet conduit 548. The treated exhaust gas has a lower concentration of environmental pollutants, including carbon monoxide (CO), nitrogen oxides (NOx), and unburned hydrocarbons (CxHy).

In operation of the assembly 50, exhaust gases from the engine 520 pass through the first exhaust conduit 522 and into the first stage catalytic converter 524 wherein a first portion 526 of the exhaust is cooled and passed on to the first outlet conduit 527, as discussed above. A second portion 528 of the exhaust is not substantially cooled and is passed on to the second outlet conduit 529.

The air injector 532 injects air into the second outlet conduit 529, which increases the oxygen content of the second potion 528 of exhaust, for example to about 0.25% to about 2.0% by volume, including about 0.5%, about 0.75%, about 1.0%, about 1.25%, about 1.5%, about 1.75%, or any range or value between any two of the foregoing percentages. The hot exhaust gas of the second exhaust stream 528 and injected air proceed through the air injection conduit 537 and merge with the cooled stream 526 of exhaust gas at junction 534 and proceed to the second catalytic converter stage 546 and exit therefrom at outlet 548. The temperature of the mixed gas stream entering the second stage catalytic converter 546 can be adjusted with the temperature adjusting valve 536.

In some embodiments, the temperature of the mixed exhaust gas (Tmix) passed through second exhaust conduit 533 to second stage catalyst 546 is from about 300° F. to about 650° F., from about 400° F. to about 500° F., from about 450° F. to about 550° F., or from about 550° F. to about 650° F., or any temperature between any two of the foregoing values. Since the second stage catalyst 546 operates at a relatively low temperature (e.g., from about 300° F. to about 650° F.), the second stage catalyst 546 is vulnerable to sulfur and/or phosphorous poisoning, as discussed above. Accordingly, the second stage catalyst 546 includes a sulfur-resistant (and/or phosphorous-resistant) catalyst as described above, e.g., with respect to FIGS. 1-4.

In some embodiments, the exhaust stream exiting the first stage catalytic converter 524 is not divided into first and second portions 526, 528. Instead, all of the exhaust stream exiting the first stage catalytic converter 524 can be cooled (e.g., to the desired Tmix temperature) and air injected before passing into second stage catalytic converter 546. This configuration can be beneficial in steady-state operation of the apparatus 50 when the mixing valve 536 does not need any (or only requires minimal) adjustment or where the mixing valve 536 is not needed.

In some embodiments, the air injector 532 can be in fluid communication with the first outlet conduit and/or the second exhaust conduit 533 instead of or in addition to the configuration illustrated in FIG. 5.

The sulfur-resistant catalyst can reduce and/or eliminate the concentration of carbon monoxide (CO) and hydrocarbons (CxHy) in the cooled mixed exhaust stream. In some embodiments, the sulfur-resistant catalyst can reduce the concentration of other organic compounds, such as one or more hazardous air pollutants (HAPs) (e.g., formaldehyde ($CH_2O$)) present in the cooled mixed exhaust stream. Since the mixed exhaust stream has an increased oxygen concentration (due to the injection of air from air injector 532), the oxidation environment at the second stage catalyst 536 is improved, which can facilitate the oxidation (and hence removal) of CO and CxHy.

Figure 6:
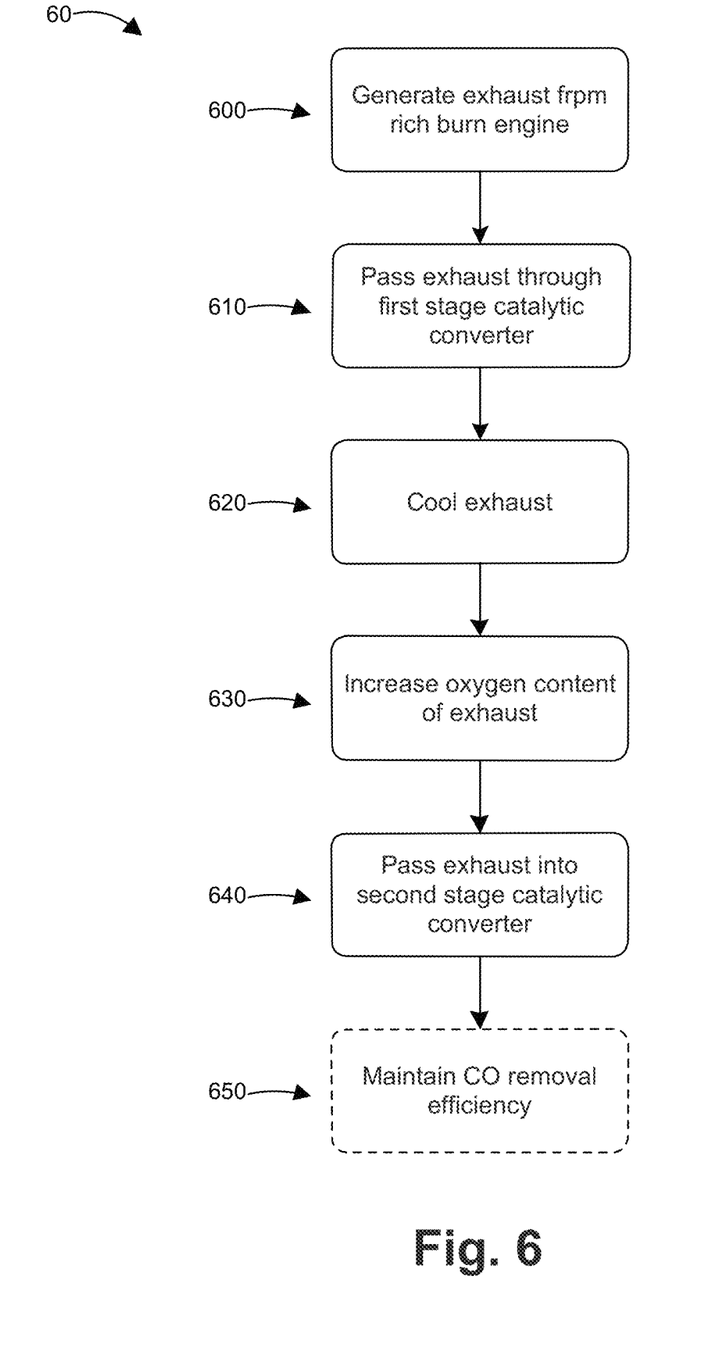
FIG. 6 is a flow chart of a method for reducing nitrogen oxides, carbon monoxide and hydrocarbons in rich burn internal combustion engine exhausts according to one or more embodiments.

FIG. 6 is a flow chart of a method 60 for reducing nitrogen oxides, carbon monoxide and hydrocarbons in rich burn internal combustion engine exhausts according to one or more embodiments. In act 600, the AFR of the exhaust is controlled so the engine (e.g., engine 520) operates in a rich burn regime. As discussed above, in the rich burn regime, the exhaust has zero or substantially zero oxygen content. In act 610, the exhaust is passed through a first stage catalytic converter (e.g., first stage catalytic converter 524). The first stage catalytic converter reduces the concentration of NOx compounds, CO, and hydrocarbons in the exhaust. In act 620, the exhaust is cooled to about 300° F. to about 650° F., from about 400° F. to about 500° F., from about 450° F. to about 550° F., or from about 550° F. to about 650° F., or any temperature between any two of the foregoing values. The cooling can occur through a thermoelectric generator, a heat exchanger, a water vaporizer, or other cooling apparatus as known in the art.

In act 630, the oxygen concentration of the exhaust is increased. For example, oxygen concentration can be increased to about 0.25% to about 2.0% by volume, including about 0.5%, about 0.75%, about 1.0%, about 1.25%, about 1.5%, about 1.75%, or any range or value between any two of the foregoing percentages. The oxygen content can be increase by injecting air, oxygen, or combination thereof in the exhaust stream. In some embodiments, the exhaust is cooled (act 620) before or after the exhaust is oxygenated (act 630). In some embodiments, the addition of ambient air to the exhaust stream is adequate to cool the exhaust stream, in which case acts 620 and 630 occur simultaneously. In some embodiments, the exhaust stream is split into two streams and only one of the streams is cooled (act 620) and/or oxygenated (act 630), for example as described above with respect to FIG. 5.

In act 640, the cooled and oxygenated gas is passed into a second stage catalytic converter that includes a poison-resistant catalyst as discussed herein. The second stage catalytic converter reduces the concentration of CO and hydrocarbons of the exhaust.

In optional act 650, the CO removal efficiency of the second stage catalytic converter is maintained after at least 500 hours of exposure to exhaust that includes sulfur and/or phosphorous compounds. It is contemplated and expected that the catalytic converter can maintain its removal efficiency of CO for up to the full life of the catalyst, which can be up to about 25,000 hours. It is also expected that the catalytic converter can maintain its removal efficiency of unburned hydrocarbons, partially combusted hydrocarbons, and/or hazardous air pollutants (HAPs) (e.g., formaldehyde) from the exhaust over the same time period.

Figure 7:
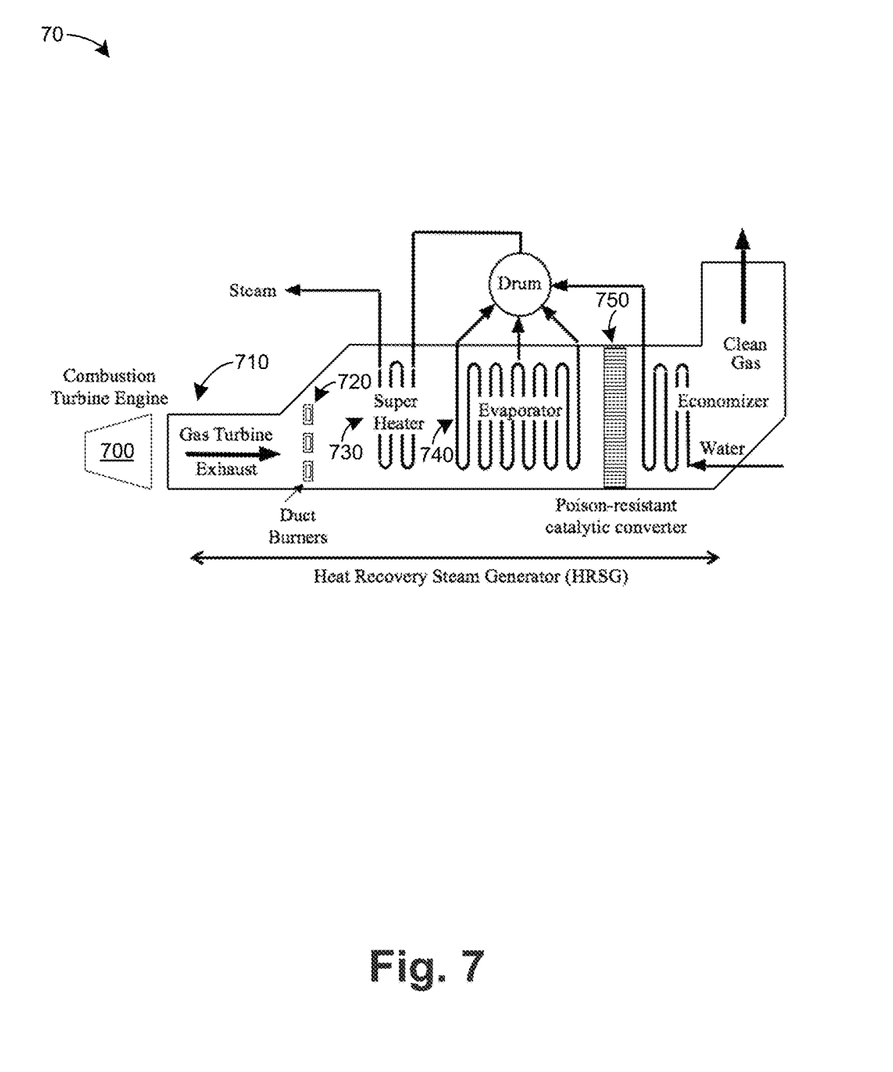
FIG. 7 illustrates a combustion turbine according to one or more embodiments.

FIG. 7 illustrates a combustion turbine 70 according to one or more embodiments. The combustion turbine 70 includes a lean burn internal combustion engine 700, a gas turbine 710, duct burners 720, super heater 730, evaporator 740, and poison-resistant catalytic converter 750. The engine 700 operates with an air-fuel ratio (AFR) in the lean burn regime (i.e., greater than a stoichiometric AFR).

In operation, the engine 700 generates exhaust gas, which passes through gas turbine 710 which converts a portion of the energy from the exhaust into electricity. The exhaust then passes over duct burners 720, which applies additional heat energy to the exhaust. Next, the exhaust passes over super heater 730 where the heated exhaust heats steam in the super heater 730 to superheated steam, which can be used to drive the turbine 710. Next, the exhaust passes over evaporator 740, which evaporates water to steam, which is then fed to super heater 730.

As a result of passing over super heater 730 and evaporator 740, the exhaust has a temperature less than or equal to about 650° F. when it passes through catalytic converter 750. Since the catalytic converter 750 operates at a relatively low temperature (e.g., less than or equal to about 650° F.), the catalytic converter 750 is vulnerable to sulfur and/or phosphorous poisoning, as discussed above. Accordingly, the catalytic converter 750 includes a sulfur-resistant (and/or phosphorous-resistant) catalyst as described above, e.g., with respect to FIGS. 1-4. The catalytic converter 750 can remove at least a portion of the CO and hydrocarbon content of the exhaust. The exhaust already includes unreacted oxygen (since engine 700 operates in the lean burn regime), so air does not need to be introduced into the exhaust stream upstream of the catalytic converter 750.

Although not illustrated in FIG. 7, the combustion turbine 70 can include additional catalytic converters, for example in a multistage emissions control system. The additional catalytic converters can be used for example to remove NOx compounds from the exhaust.

Figure 8:
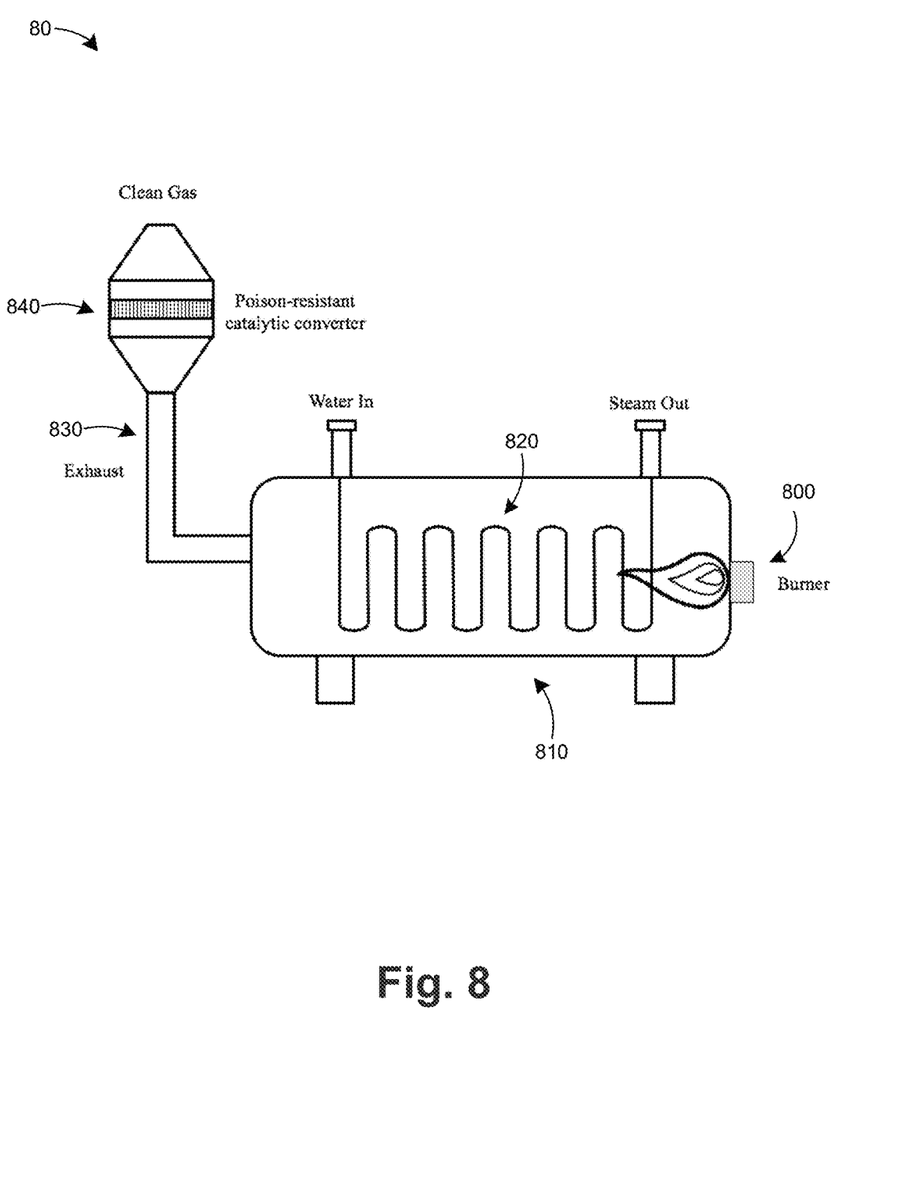
FIG. 8 illustrates a boiler according to one or more embodiments.

FIG. 8 illustrates a boiler 80 according to one or more embodiments. The boiler 80 includes a lean burn internal combustion engine 800, an evaporator 810, a heat exchanger 820, an exhaust conduit 830, and a poison-resistant catalytic converter 840. The engine 800 operates with an air-fuel ratio (AFR) in the lean burn regime (i.e., greater than a stoichiometric AFR).

In operation, the engine 800 generates exhaust gas, which passes over heat exchanger 820 in evaporator 810. Heat from the exhaust gas is transferred to water flowing in the heat exchanger 820, causing the water to boil and become steam. Next, the exhaust passes through exhaust conduit 830 to poison-resistant catalytic converter 840.

As a result of passing over heat exchanger 820, the exhaust has a temperature less than or equal to about 650° F. when it passes through catalytic converter 840. Since the catalytic converter 840 operates at a relatively low temperature (e.g., less than or equal to about 650° F.), the catalytic converter 840 is vulnerable to sulfur and/or phosphorous poisoning, as discussed above. Accordingly, the catalytic converter 840 includes a sulfur-resistant (and/or phosphorous-resistant) catalyst as described above, e.g., with respect to FIGS. 1-4. The catalytic converter 840 can remove at least a portion of the CO and hydrocarbon content of the exhaust. The exhaust already includes unreacted oxygen (since engine 800 operates in the lean burn regime), so air does not need to be introduced into the exhaust stream upstream of the catalytic converter 840.

Although not illustrated in FIG. 8, the boiler 80 can include additional catalytic converters, for example in a multistage emissions control system. The additional catalytic converters can be used for example to remove NOx compounds from the exhaust.

In some embodiments, a lean burn engine generates exhaust having a temperature less than or equal to 650° F., such as 300° F. to about 650° F., from about 400° F. to about 500° F., from about 450° F. to about 550° F., or from about 550° F. to about 650° F., or any temperature between any two of the foregoing values. The poison-resistant catalyst described herein can be used with such a lean burn engine without passing the exhaust over a heat exchanger upstream of the engine.

Figure 9:
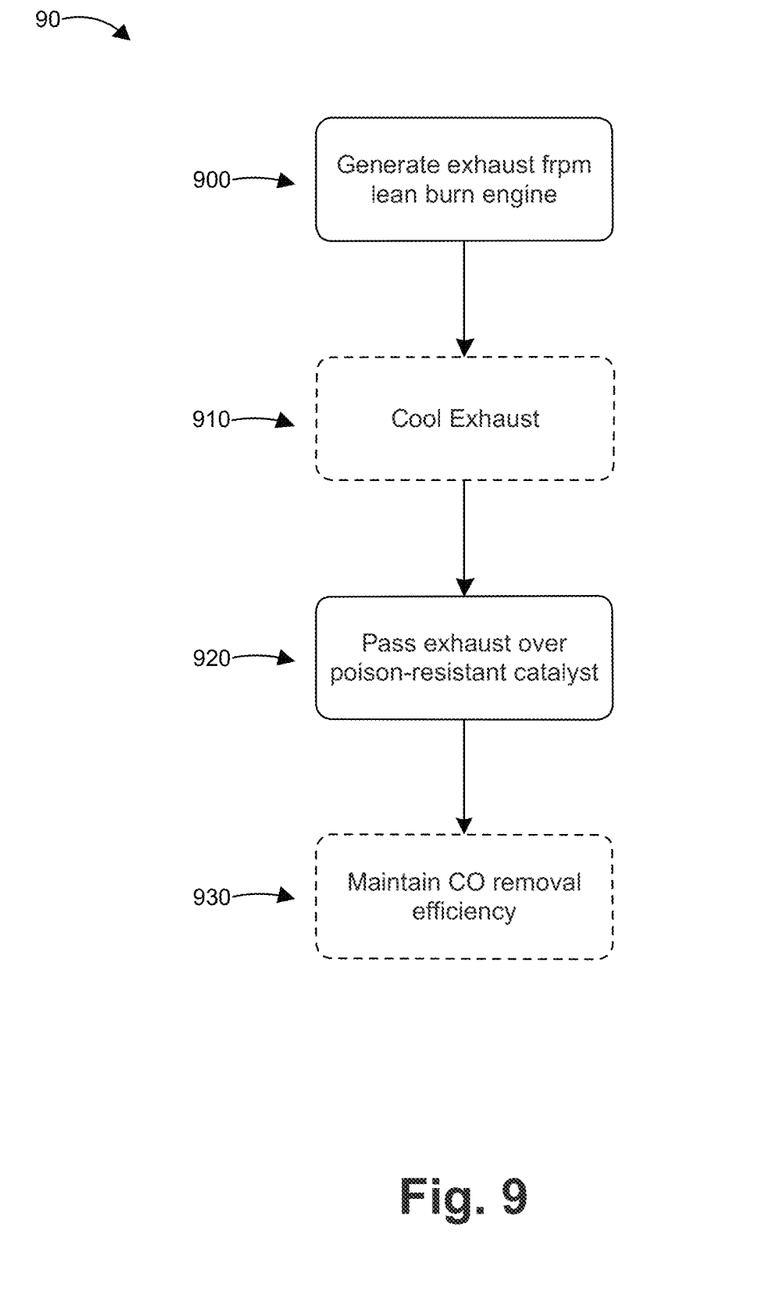
FIG. 9 is a flow chart of a method for reducing carbon monoxide and hydrocarbons in lean burn internal combustion engine exhausts according to one or more embodiments.

FIG. 9 is a flow chart of a method 90 for reducing carbon monoxide and hydrocarbons in lean burn internal combustion engine exhausts according to one or more embodiments. In act 900, the AFR of the engine is controlled so the engine operates in the lean burn regime (i.e., an AFR greater than a stoichiometric AFR needed for complete combustion of the fuel). In the lean burn regime, the engine operates with more oxygen than needed for complete combustion of the fuel. As such, the exhaust produced by a lean burn engine includes some unreacted oxygen. In some embodiments, the lean-burn exhaust includes about 3% to about 17% oxygen by volume, including about 5% oxygen by volume, about 7% oxygen by volume, about 9% oxygen by volume, about 11% oxygen by volume, about 13% oxygen by volume, about 15% oxygen by volume, or any concentration or concentration range between any two of the foregoing values. The lean-burning engine can be a component of any number of systems including a vehicle, a combustion turbine, a boiler, or other system as known in the art.

In optional act 910, the exhaust is optionally cooled to about 650° F. or less, such as 300° F. to about 650° F., from about 400° F. to about 500° F., from about 450° F. to about 550° F., or from about 550° F. to about 650° F., or any temperature between any two of the foregoing values. Alternatively, the exhaust produced by the engine in act 900 is already at a temperature of about 650° F. or less. The cooling in optional act 910 can occur using a cooling apparatus, such as a water injector/vaporizer, an air injector, a heat exchanger, a thermoelectric generator, cooling coils, and/or other apparatus as known in the art. A cooling apparatus that includes a heat exchanger can be used to generate steam, which can be used to drive a turbine (e.g., in a combustion turbine). Steam can also be used as part of a boiler system or a combined heat and power system.

In act 920, the exhaust is passed through a catalytic converter that includes a poison-resistant catalyst, as described above. Since the lean burn exhaust includes unreacted oxygen (since engine 800 operates in the lean burn regime), air does not need to be introduced into the exhaust upstream of the catalytic converter to facilitate the oxidation of CO and unburned hydrocarbons in the catalytic converter. After passing through the catalytic converter, the exhaust has lower concentration of CO and unburned hydrocarbons than the exhaust entering the catalytic converter.

In optional act 930, the catalytic converter maintains its removal efficiency of CO from the exhaust over a predetermined time period, such as at least about 500 hours or more as discussed above. It is contemplated and expected that the catalytic converter can maintain its removal efficiency of CO for up to the full life of the catalyst, which can be up to about 25,000 hours. It is also expected that the catalytic converter can maintain its removal efficiency of unburned hydrocarbons, partially combusted hydrocarbons, and/or hazardous air pollutants (HAPs) (e.g., formaldehyde) from the exhaust over the same time period.

In some embodiments, the method 90 includes passing the exhaust through one or more additional catalytic converter stages. For example, the exhaust can pass through a selective-catalytic reduction (SCR) apparatus before or after passing through the catalytic converter that includes the poison-resistant catalyst. In addition or in the alternative, the exhaust can pass through a TWC before or after the catalytic converter that includes the poison-resistant catalyst and/or the SCR apparatus.

Therefore it can be seen from the above disclosure that the novel catalytic apparatus resists poisoning from sulfur and/or phosphorous compounds found in the exhaust stream of spark-ignited internal combustion engines. The catalytic apparatus can be used to reduce and/or eliminate CO and CxHy compounds in cooled exhaust streams in multistage emission control systems for rich burn engines without such poisoning. An example of a system that includes a rich burn engine is a combined heat and power (CHP) system. The catalytic apparatus can also be used in emission control systems to reduce and/or eliminate CO and CxHy compounds from exhaust streams produced by lean burn engines without such poisoning. Examples of systems that include a lean burn engine are a combustion turbine engine and a boiler.

The present disclosure should not be considered limited to the particular embodiments described above. Additional modifications, equivalent processes, as well as numerous structures to which the present disclosure may be applicable, will be readily apparent to those skilled in the art to which the present disclosure is directed upon review of the present disclosure.

What is claimed is:

1. A catalytic converter comprising:
   a substrate body having a plurality of cells that define respective apertures; and
   a washcoat disposed on the substrate, the washcoat including:
     a support material comprised of support particles of at least one of titania or silica; and
     a plurality of catalyst particles disposed in the support material, the catalyst particles comprised of a platinum group metal, the platinum group metal including at least one of Pt, Pd, and Rh, wherein the catalyst particles are uniformly distributed in the support material.

2. The catalytic converter of claim 1, wherein the support material further comprises a transition metal oxide.

3. The catalytic converter of claim 1, wherein the support material further comprises a rare earth metal oxide.

4. The catalytic converter of claim 1, wherein the support material comprises titania and the catalyst particles are comprised of at least one of Pt and Pd.

5. The catalytic converter of claim 4, wherein the support material comprises 50% to 98% titania by weight.

6. The catalytic converter of claim 5, wherein the support material comprises 10% to 50% of an oxide of at least one of Si, Al, Ce, Zr, Fe, Cu, Zn, Mo, W, and Mn.

* * * * *